Feb. 15, 1966   B. I. ULINSKI   3,235,042
BRAKE AND CONTROLLER ARRANGEMENT FOR ELECTRIC INDUSTRIAL TRUCK
Filed April 11, 1961   3 Sheets-Sheet 2

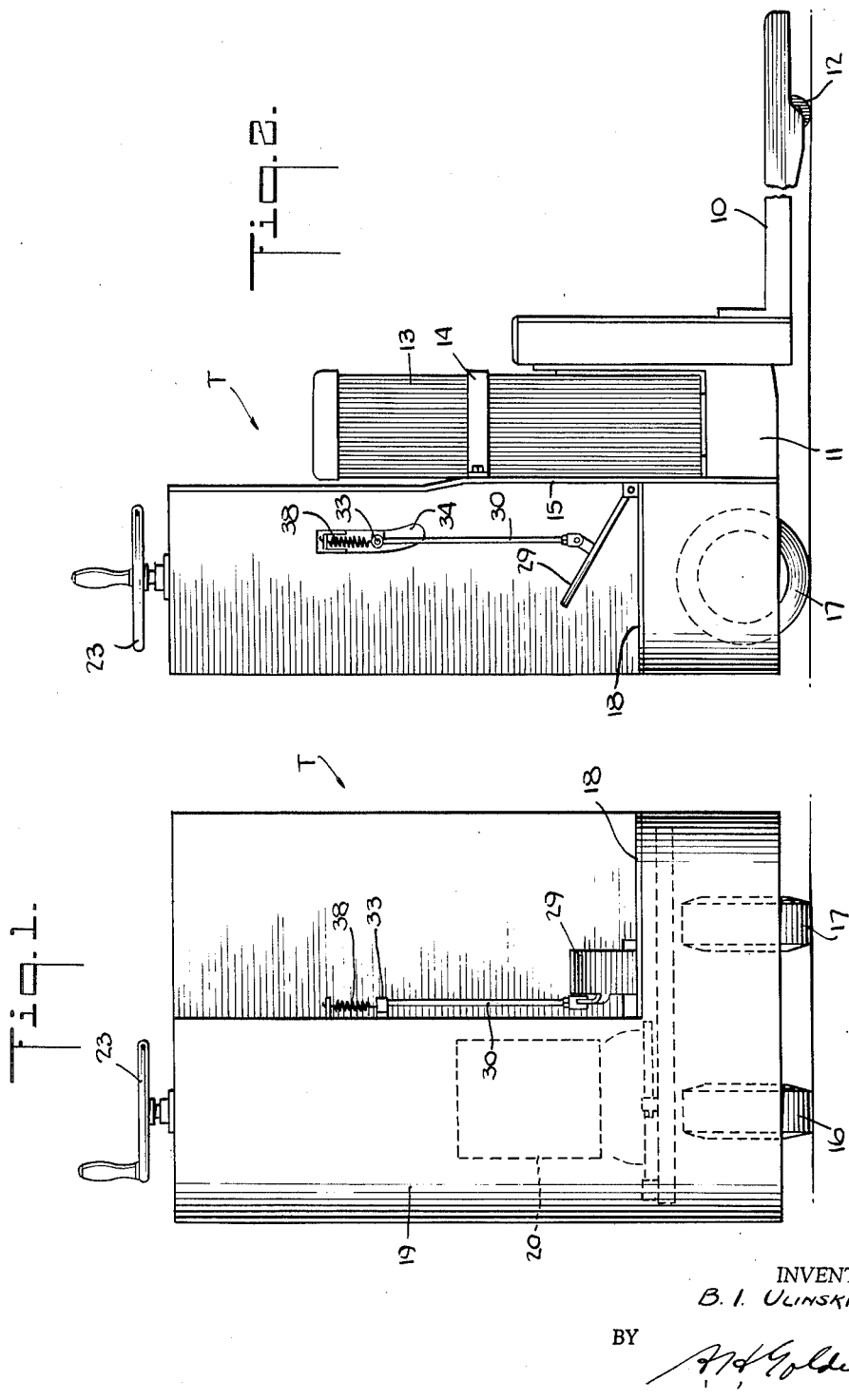

INVENTOR.
B. I. ULINSKI
BY
ATTORNEY

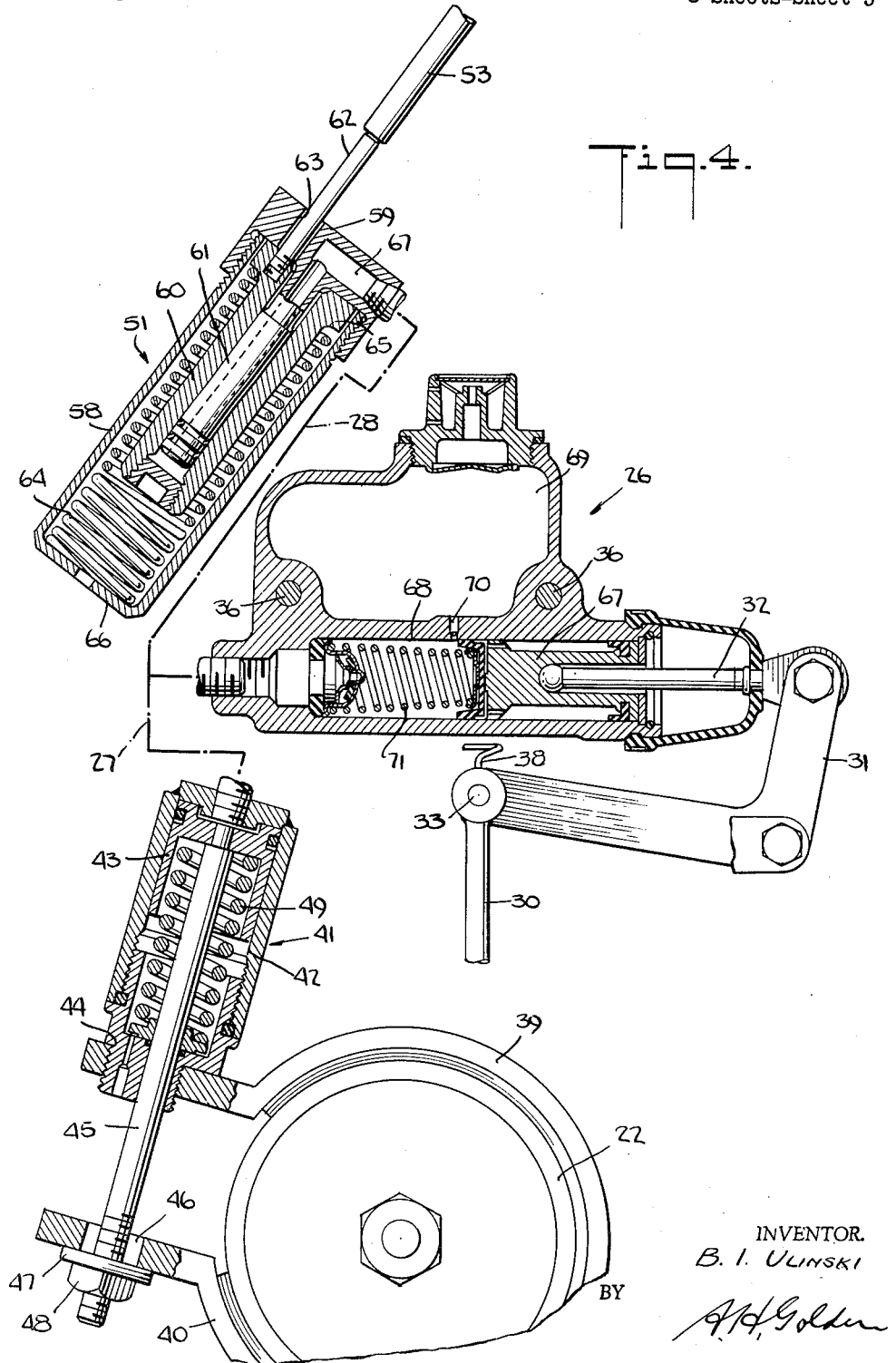

United States Patent Office 3,235,042
Patented Feb. 15, 1966

3,235,042
BRAKE AND CONTROLLER ARRANGEMENT
FOR ELECTRIC INDUSTRIAL TRUCK
Bronislaus I. Ulinski, Flossmoor, Ill., assignor, by mesne assignments, to Yale & Towne, Inc., New York, N.Y., a company of Ohio
Filed Apr. 11, 1961, Ser. No. 102,186
5 Claims. (Cl. 192—2)

This invention relates to an electrically operated industrial truck, and in particular, to an arrangement of intercontrol between the brake and the controller for the electrical traction motor of such a truck.

Electrically operated trucks heretofore have been provided with elaborate, complicated arrangements of rods, levers and other mechanical means providing intercontrol or interconnection between the brake and the controller whereby the controller is moved to neutral position to de-energize the traction motor whenever the brake is applied, and the controller is again actuated to energize the motor when the brake is released. Such an arrangement simplifies the operation of the truck and prevents the traction motor from being overloaded when the brake is applied.

The purpose of this invention is to provide a simple arrangement of intercontrol between the brake and controller which will eliminate the necessity of the elaborate system of rods, levers and other mechanical means as heretofore used, thereby simplifying the design, fabrication and maintenance of the truck.

To this end, the arrangement includes a fluid pressure operable controller unit and a fluid pressure operable brake unit which are connected by suitable conduits to a master cylinder whereby operation of the master cylinder supplies fluid pressure to both the brake and the controller to first release the brake and then operate the controller. When the master cylinder is released, the controller is returned to neutral position and the brake then applied.

By this arrangement, the intercontrol or interconnection between the controller and the brake is provided primarily by the fluid conduits. As these conduits may be flexible, they may be readily passed or woven around structural elements of the truck in a manner not possible with levers and links, thereby simplifying the design, fabrication and maintenance of the truck. This flexibility of the conduits and the simplicity of the arrangement of the invention also allows the arrangement to be readily incorporated in existing trucks as very little, if any, structural changes have to be made to accommodate the arrangement in such trucks.

The invention and its advantages having been broadly described, a more detailed description of one embodiment of the invention is described hereafter in conjunction with the accompanying drawings, wherein:

FIG. 1 is a front elevational view of a truck incorporating a brake and controller arrangement in accordance with the invention;

FIG. 2 is a side elevational view of the truck shown in FIG. 1;

Figure 3:
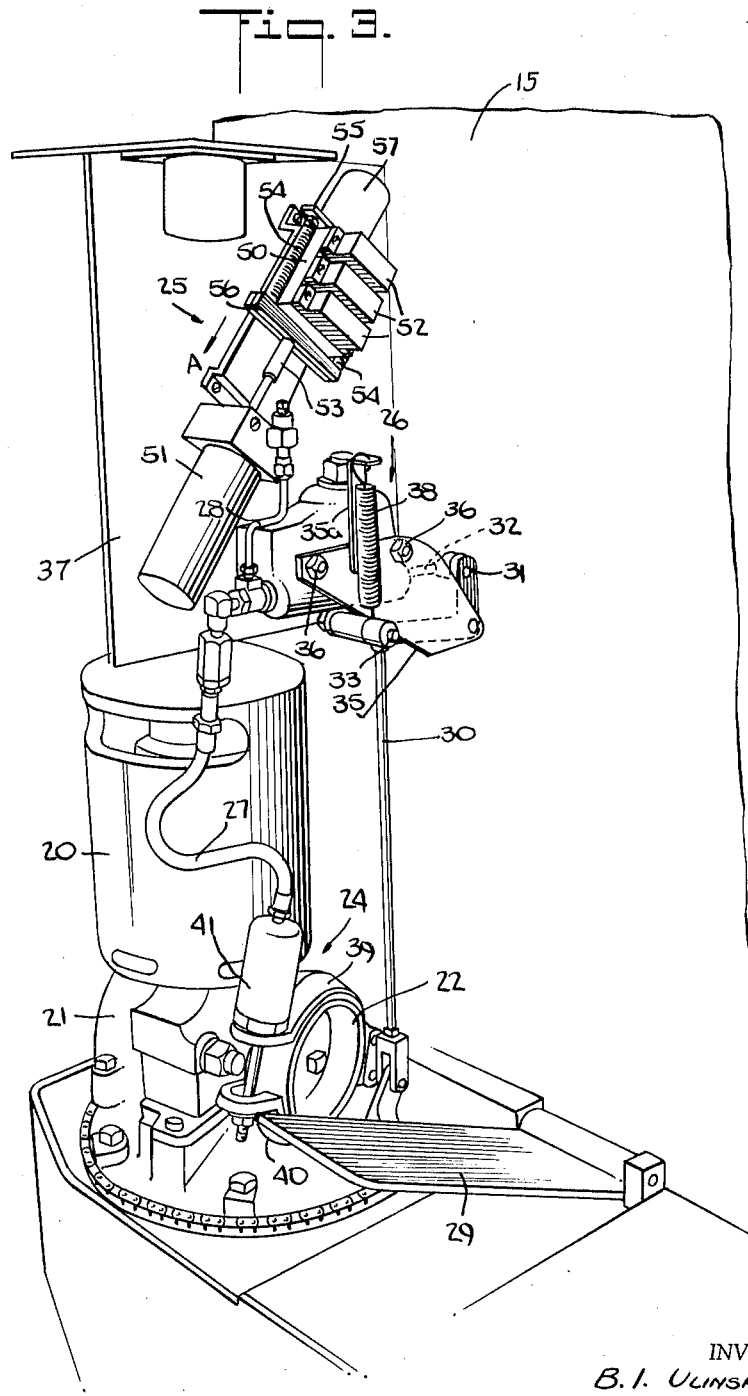

FIG. 3 is a perspective view of the portion of the truck incorporating the traction unit showing the housing which normally covers such portion removed to reveal the traction motor, brake, controller, conduits, and master cylinder for operating the brake and controller; and FIG. 4 is a sectional view showing the hydraulic actuator of the controller, the hydraulic actuator of the brake, and the master cylinder, together with a diagrammatic showing of the fluid circuit.

Referring to the drawings, and in particular to FIGS. 1 and 2, the brake and controller arrangement of the invention is shown applied to a conventional industrial lift truck T. While the particular truck illustrated is of the general type described in United States Patent No. 2,713,918, it will be appreciated that the arrangement of the invention may be used on other types and styles of industrial trucks.

The particular details of the truck form no part of the invention, and it is sufficient to an understanding of the invention to point out that the truck includes a load platform 10 supported at its forward end on a main frame 11 of the truck and at its rear end upon wheels 12. A battery 13 for supplying electrical energy to the traction motor of the truck is supported on the main frame 11 forward of the platform 10 and is clamped by a strap 14 to a transversely extending vertical frame plate 15 which in turn is secured to the frame 11.

The forward end of the frame 11 is supported on steerable wheels 16 and 17 and is provided on one side with a platform 18 on which the operator of the truck may stand while operating the truck. The opposite side of the forward end of the frame 11 is provided with a removable housing 19 which encloses, as best shown in FIG. 3, an electrical traction motor 20 which drives the wheel 16 through a transmission 21. The particular transmission illustrated is of the type described in United States Patent No. 2,929,460 and includes an external brake drum 22 to which a braking force may be applied to stop movement of the truck.

The steerable wheels 16 and 17 are adapted to be steered by a steering wheel 23 extending from the top of the housing 19 and connected to the wheels 16 and 17 in the manner as shown in United States Patent No. 2,713,918.

In accordance with the invention, the truck is provided with a fluid pressure operable brake unit 24, a fluid pressure operable controller unit 25, and a master cylinder 26 which, as best shown in FIG. 3, are conveniently mounted adjacent to the motor 20 so as to be normally concealed by the housing 19. The brake unit 24 is connected to the master cylinder 26 by means of a flexible conduit 27 and the controller unit 25 is connected to the master cylinder 26 by a conduit 28 so that when the master cylinder 26 is operated, fluid under pressure will be supplied to both the brake unit 24 and the controller unit 25. As will be described in more detail hereafter, the brake unit 24 and the controller unit 25 are so designed that it takes greater fluid pressure to operate the controller unit than the brake unit and when the master cylinder 26 is operated, the brake unit 24 is first actuated to release the brake and the controller unit is then actuated to energize the traction motor 20.

The master cylinder 26 is conveniently actuated by a foot treadle 29 which is pivotally mounted on the operator's platform 18 and is connected by means of a rod 30 and a bell crank lever 31 to the operating rod 32 of the master cylinder so that when the treadle 29 is depressed, the master cylinder 26 is actuated to supply fluid under pressure to the brake unit 24 and the controller unit 25.

The rod 30 is pivotally connected at its lower end to the treadle 29 and is connected at its upper end to a leg of the bell crank lever 31 by means of an elongated pivot pin 33 which extends through an elongated opening 34 in the housing 19 as shown in FIG. 2. The bell crank 31 is pivotally mounted on a bracket 35 which in turn is secured to the side of the master cylinder 26 by bolts 36 which extend through the master cylinder and secure the master cylinder to a vertical plate bracket 37. Bracket 37 is in turn secured to the transverse frame plate 15. An extension spring 38 is secured at one end to a vertical extension 35a of the bracket 35 and is secured at the other end to the upper end of the rod 30 so as to urge the treadle 29 to the raised position.

The brake unit 24 includes a pair of pivotally mounted brake shoes 39 and 40, which surround the brake drum 22, and a hydraulic actuator 41 for releasing the brake shoes. As best shown in FIG. 4, the actuator 41 includes a cylinder 42 having a piston 43 slidable therein and a threaded end 44 by which it is secured to the free end of the brake shoe 39. The piston 43 has a piston rod 45 secured thereto which extends slidably through the threaded end 44 and through an opening 46 in the free end of the brake shoe 40. The end of the piston rod 45 which extends through opening 46 is provided with a washer 47 and a nut 48 by which a pulling force may be transmitted from the rod 43 to the brake shoe 40 to draw the free ends of the brake shoes 39 and 40 together to apply a braking force to the drum 22.

The force for drawing the free ends of the brake shoes together to apply such a braking force to the brake drum 22 is supplied by a compressed spring 49 within the cylinder 42 which bears at one end against the piston 43 and bears at the other end against the inner surface of the threaded end 44 of the cylinder so as to always urge the piston 43 in a direction to draw the piston rod 45 within the cylinder 42 so that the brake shoes 39 and 40 are forced tightly against the brake drum 22 to prevent movement of the truck.

The brake shoes 39 and 40 are adapted to be released from braking engagement with the brake drum 22 by operation of the master cylinder 26 to apply fluid under pressure through the conduit 27 to the cylinder 42 to move the piston 43 relative to the cylinder against the force of the spring 49 so as to compress the spring 49 and extend the piston rod 45 thereby releasing the brake shoes 39 and 40 from braking engagement with the brake drum 22. When the fluid pressure in the cylinder 49 is relieved by releasing the master cylinder 26, the brake shoes 39 and 40 are again drawn against the brake drum 22 by the spring 49 to provide a braking force.

As best shown in FIG. 3, the controller unit 25 for the traction motor 20 includes a push rod type controller or accelerating switch 50 and a hydraulic actuator 51. The controller 50 is of conventional construction and includes a plurality of switches 52 mounted on the side thereof which are actuated one at a time, or in predetermined combinations, by movement of a control rod or plunger 53 to vary the speed of the traction motor 20 in the well-known manner. The speed of the motor, therefore, is determined by the position of the control rod 53. The control rod 53 is normally urged in the direction of the arrow in FIG. 3 to a high speed position by compression springs 54 which bear at one end against a cross bar 55 fixed to the housing of the controller and bear at the other end against a cross bar 56 secured to the control rod 53. A dashpot 57 is connected with the control rod 53 to prevent the control rod from being moved too rapidly by the springs 54 and causing excessive acceleration of the truck.

As best shown in FIG. 4, the hydraulic actuator 51 of the controller unit 25 includes a cylinder 58 which is closed at one end by a head member 59 and has a hollow piston 60 mounted therein for sliding movement on a hollow, cylindrical guide 61 forming an integral extension of the head member 59. The piston 60 has a plunger 62 secured to the end thereof which extends through an opening 63 through the head member 59. A compression spring 64 positioned within the cylinder 58 bears at one end against a shoulder 65 on the piston 60 and at the other end against an end 66 of the cylinder 58 so as to normally urge the piston 60 in a direction to extend the plunger 62 from the cylinder 58. As best shown in FIG. 3, the controller 50 and hydraulic actuator 51 are secured to the bracket 37 with the plunger 61 in axial alignment with the control rod 53, and when the plunger 62 is completely extended by the spring 64, it holds the control rod 53 of the controller 50 in a neutral position against the force of the springs 54 so that the motor 20 is de-energized.

When, however, the master cylinder 26 is operated, fluid under pressure flows through the conduit 28, a passage 67 in the head member 59, and the hollow guide 61 and moves the piston 60 to the left compressing the spring 64 and moving the plunger 62 inwardly of the cylinder 58, thereby releasing the control rod 53 and allowing the springs 54 of the controller 50 to move the control rod 53 toward high speed position under the control of the dashpot 57, to energize the motor 20 and to bring the motor up to a particular speed.

As best shown in FIG. 4, the master cylinder 26 is of conventional design and includes a piston 67 movable in a cylindrical bore 68 and a fluid reservoir 69 connected with the cylindrical bore by a passage 70. When the treadle 29 is depressed by the operator of the truck, the bell crank lever 31 is rotated in a counterclockwise direction, as viewed in FIGS. 3 and 4, by the rod 30 causing the operating rod 32 to move the piston 67 towards the left against the force of a return spring 71. As the piston 67 is moved towards the left, it forces fluid through the conduits 27 and 28 to the hydraulic actuator 41 of the brake unit 24 and the hydraulic actuator 51 of the controller unit 25.

The area of the piston 43 of the hydraulic actuator 41 on which the fluid pressure from the master cylinder acts and the deflection characteristics of the spring 49 are so selected relatively to the area of the piston 60 of the hydraulic actuator 51 on which the fluid pressure acts and the spring characteristics of the spring 64 that it takes substantially less fluid pressure to move the piston 43 to release the brake shoes 39 and 40 than it does to move the piston 60 to release the control rod 53 of the controller 50. Thus, initial movement of the piston 67 of the master cylinder 26 results in operation of the hydraulic actuator 41 to release the brake shoes 39 and 40, and further movement of the piston 67 results in actuation of the hydraulic operator 51 to release the control rod 53 of the controller 50 so that the traction motor 20 is energized and brought up to a speed determined by the position of the control rod 53. Thus, the motor 20 is not energized until after the brake shoes 39 and 40 are released.

When the treadle 29 is released by the operator, the piston 67 of the master cylinder 26 moves to the left releasing the fluid pressure on the hydraulic actuator 41 and hydraulic actuator 51, and the sequence of operation of the brake and the controller is reversed, with the control rod 53 being first moved to neutral position by the force of spring 64 to de-energize the motor 20, and the brake shoes 39 and 40 then being drawn into braking engagement with the brake drum 22 by the force of spring 49 to stop movement of the truck. Thus, the operator of the truck only has to depress or release the treadle 29 to operate or stop the truck and the brake and controller will be actuated in the proper sequence to prevent overloading of the traction motor 20. If for any reason, there is a failure in the fluid system with a resulting leakage of fluid and loss of pressure while the treadle 29 is depressed, the control rod 53 of the controller 50 will be automatically moved to neutral position by the spring 64 to de-energize the motor 20, and the brake shoes 39 and 40 automatically engaged with the brake drum 22 by the spring 49 to stop movement of the truck.

From the preceding description, it can be seen that there is provided an extremely simple arrangement of intercontrol between the brake and the electric controller of an electrically operated industrial truck which provides for the proper sequence of operation of the brake and controller to prevent overloading of the traction motor of the truck. The arrangement is not only useful in new truck construction because it simplifies the design, fabrication and maintenance thereof, but is also useful in modifying existing trucks as it may be readily incorporated into such trucks with little or no change in the trucks.

While a preferred embodiment of the invention has been shown and described, it will be appreciated that this is for the purpose of illustration and that changes may be made therein without departing from the spirit and scope of the invention.

I claim:

1. In an industrial truck, a traction wheel, an electric traction motor, means operatively connecting said traction motor to said traction wheel whereby operation of said motor drives said traction wheel, a fluid pressure operable electric controller unit operatively connected with said traction motor and operated by a change in fluid pressure applied thereto to energize said traction motor to drive said traction wheel, a brake unit for applying a braking force to said truck and operable by a change in fluid pressure applied thereto to release said braking force, manually operable pump means, conduit means connecting said pump means to said controller unit and to said brake unit and through which operation of said manually operable pump means applies fluid pressure to said brake unit and to said controller unit and means controlled by the application of pressure by said manually operable pump means to effect sequential operation of said brake unit and controller unit so as to first release said braking force and thereafter to operate said controller unit to energize said motor to drive said traction wheel.

2. In an industrial truck, an electric traction motor for said truck, an electric controller operatively connected with said motor and movable between a neutral position and a high speed position, first biasing means yieldingly urging said controller to high speed position, second biasing means overcoming the force of said first biasing means to move said controller to neutral position, a first hydraulic actuator containing said second biasing means operatively connected with said second biasing means and operable to render said second biasing means ineffective so that said first means may move said controller toward high speed position, brake means including a pair of pivotally mounted brake shoes for said truck, third means yieldingly actuating said brake shoes to provide a braking force, a second hydraulic actuator containing said third biasing means and operatively connected to said brake shoes to release said brake shoes, a master cylinder, conduit means connecting said master cylinder to both of said hydraulic actuators, and means operatively connected with said master cylinder for operating said master cylinder to supply fluid pressure through said conduit means to both of said hydraulic actuators to sequentially overcome said third and second biasing means and to operate said hydraulic actuators and thereby first release said brake means and then render said second biasing means ineffective to allow said first biasing means to urge said controller to high speed position.

3. In an industrial truck, an electric traction motor for said truck, an electric controller operatively connected with said motor and movable between a neutral position and a high speed position, first spring means urging said controller to high speed position, second spring means overcoming the force of said first spring means to move said controller to neutral position, a first hydraulic actuator operatively connected with said second spring means for rendering said second spring means ineffective so that said first spring means may move said controller toward high speed position, brake means including a pair of pivotally mounted brake shoes for said truck, third spring means actuating said brake shoes to provide a braking force, a second hydraulic actuator operable to overcome said third spring means and release said brake shoes, a master cylinder, conduit means connecting said master cylinder to both of said hydraulic actuators, and means operatively connected with said master cylinder for operating said master cylinder to supply fluid pressure through said conduit means to both of said hydraulic actuators to sequentially overcome said third and second spring means and operate said hydraulic actuators to first release the brake and then render said second means ineffective to allow said first springs means to urge said controller to high speed position.

4. In an industrial truck, an electric traction motor for said truck, an electric controller operatively connected with said motor and movable between a neutral position and a high speed position, acceleration control means for controlling the movement of said controller to high speed position to prevent excessive acceleration of the truck, first spring means urging said controller to high speed position, second spring means overcoming the force of said first spring means to move said controller to neutral position, a first hydraulic actuator operatively connected with said second spring means for rendering said second spring means ineffective so that said first spring means may move said controller toward high speed position under the control of said acceleration control means, brake means including a pair of pivotally mounted brake shoes for said truck, third spring means actuating said brake shoe means to provide a braking force, a second hydraulic actuator operable to release said brake shoes, a master cylinder, conduit means connecting said master cylinder to both of said hydraulic actuators, and means operatively connected with said master cylinder for operating said master cylinder to supply fluid pressure through said conduit means to both of said hydraulic actuators to sequentially overcome said third and second spring means and operate said hydraulic actuators and thereby first release the brake and then render said second spring means ineffective to allow said first spring means to urge said controller to high speed under the control of said acceleration control means.

5. In an industrial truck, an electric traction motor for said truck, an electric controller operatively connected with said motor and movable between a neutral position and a high speed position, dashpot means for controlling the movement of said controller to high speed position to prevent excessive acceleration of the truck, first spring means urging said controller to high speed position, second spring means overcoming the force of said first spring means to move said controller to neutral position, a first hydraulic actuator operatively connected with said second spring means for rendering said second spring means ineffective so that said first spring means may move said controller toward high speed position under the control of said dashpot means, brake means including a pair of pivotally mounted brake shoes for said truck, third spring means actuating said brake shoes to provide a braking force, a second hydraulic actuator operable to release said brake shoes, a master cylinder, conduit means connecting said master cylinder to both of said hydraulic actuators, and means operatively connected with said master cylinder for operating said master cylinder to supply fluid pressure through said conduit means to both of said hydraulic actuators to sequentially overcome said third and second spring means and thereby operate said hydraulic actuators to first release the brake and then render said second spring means ineffective to allow said first spring means to urge said controller to high speed under the control of said dashpot means.

References Cited by the Examiner

UNITED STATES PATENTS

| 1,906,699 | 5/1933 | Mallison et al. | 303—6.1 |
| 2,316,396 | 4/1943 | Breese | 192—3 X |
| 2,454,291 | 11/1948 | Penrose | 303—3 X |
| 2,525,461 | 10/1950 | Schnell | 303—3 X |
| 2,917,143 | 12/1959 | Jenney | 303—6 |
| 2,945,572 | 7/1960 | Rye | 192—2 X |

DON A. WAITE, *Primary Examiner.*

BROUGHTON G. DURHAM, *Examiner.*